None

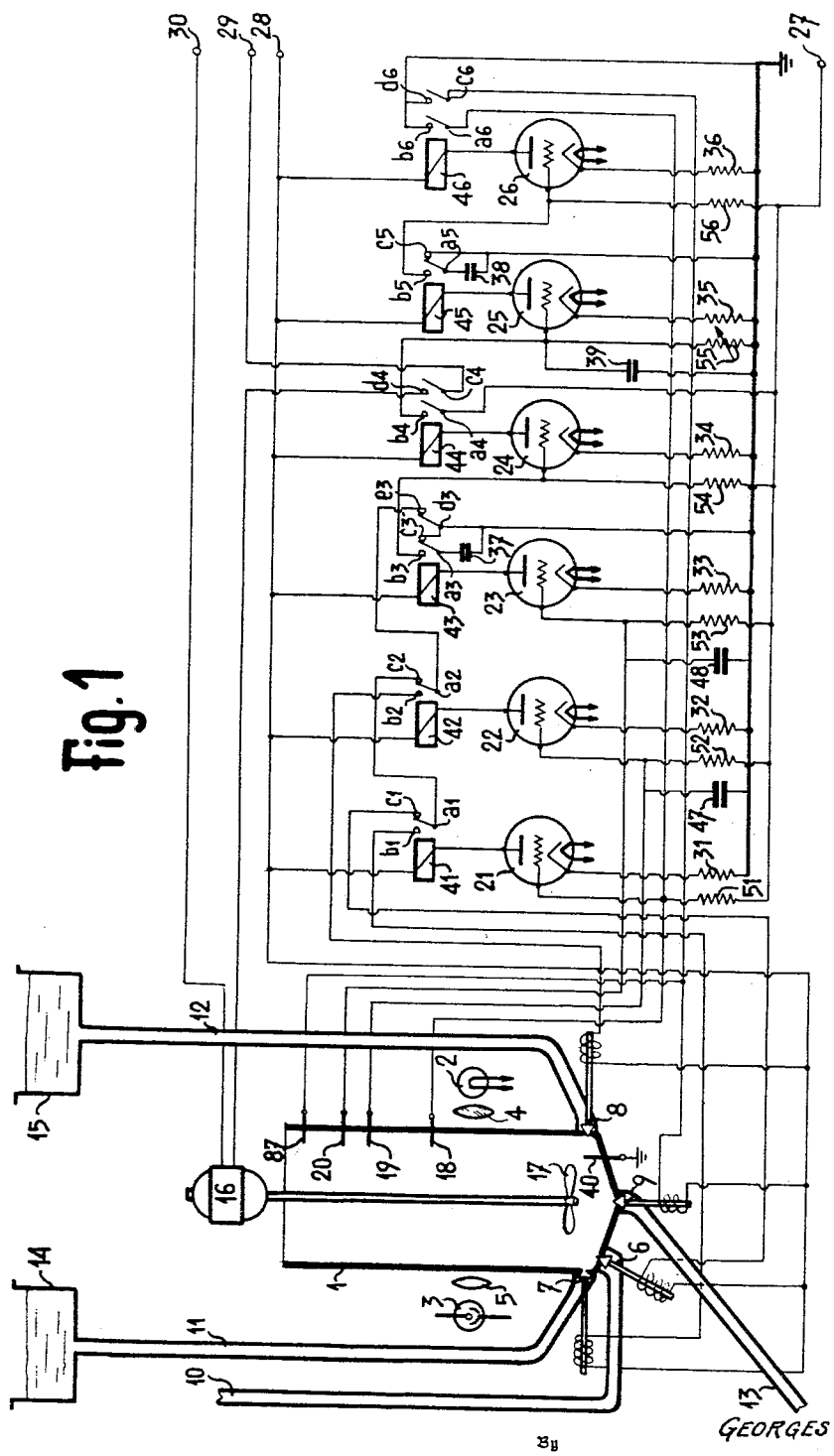

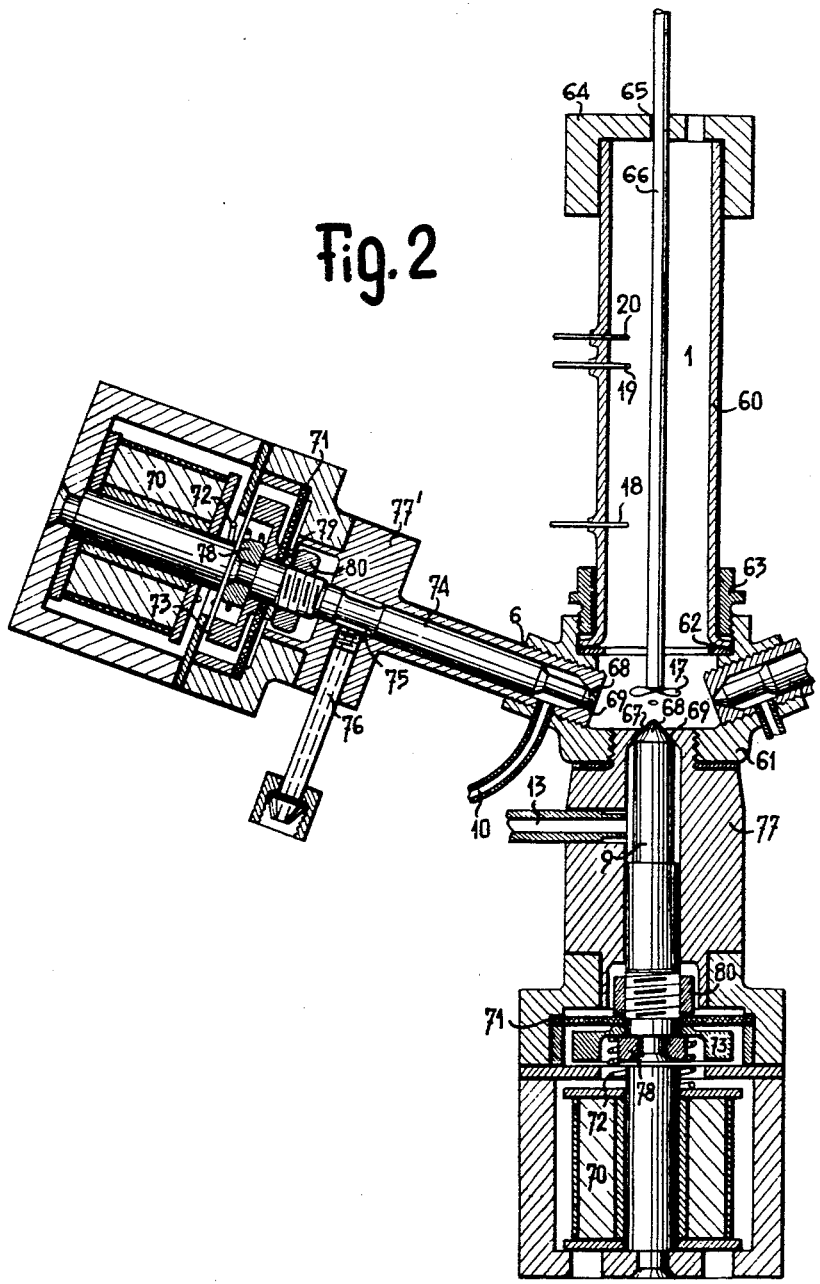

United States Patent Office 2,726,936
Patented Dec. 13, 1955

2,726,936

APPARATUS FOR ANALYZING THE COMPOSITION OF LIQUIDS

Georges W. Bernheim, Bern, Switzerland

Application September 10, 1951, Serial No. 245,900

5 Claims. (Cl. 23—253)

This invention relates to an apparatus for automatically analyzing the composition of a liquid by colorimetric means.

Objects and advantages of the invention will be set forth in part hereinafter and in part will be obvious herefrom, or may be learned by practice with the invention, the same being realized and attained by means of the combinations and improvements pointed out in the appended claims.

The invention consists in the novel parts, constructions and arrangements herein shown and described.

An object of this invention is to provide a novel apparatus for automatically analyzing the composition of a liquid with a high degree of precision.

Another object of my invention is to provide an apparatus which may be used to automatically analyze liquids of different compositions.

A further object of the invention is to provide an apparatus for automatically analyzing the composition of a liquid with the use of the minimum amount of ingredients, especially, in relation to automatic titration of a liquid.

The accompanying drawings, referred to herein and constituting a part hereof, illustrate one embodiment of the invention, and together with the description, serve to explain the principles of the invention.

Fig. 1 represents diagrammatically a form of embodiment of the subject matter of the invention.

Fig. 2 shows a section of two electromagnetic valves and their connection with the receiving vessel.

In the past, the principle of colorimetric control of a liquid by means of a photoelectric cell has been used both by batch and continuous measurement. For example, it is old to automatically analyze for the chlorine content in water by means of two valves, one of which introduces a certain amount of water into a receiving vessel and the other which introduces a coloring reagent, said receiving vessel being placed between a source of light and a photoelectric cell. The coloration of the liquid composition is compared with that of a standard and according to the result of the comparison, electric controls bring about an increase or decrease of the quantity of chlorine in the water. This operation has the disadvantage that there is no exact control for a certain quantity always remains in the supply pipe below the control valve, and it is impossible to know the degree to which it influences the content of the mixing vessel where the control is effected. If a portion of this reagent is diluted in the content of the receiving vessel, the dose is then too strong, while the following control will be effected adversely due to the introduction of a portion of reagent already diluted.

It is also known to use colorimetric analysis which is operated continuously. The reagent or reagents are mixed with the liquid to be controlled by means of siphoning into the receiving vessel at constant level. The mixture is afterwards subjected to a control by a photoelectric cell. However, in this process considerable quantities of reagent are needed and the supply of the reagent as well as the mixing of the latter with the liquid to be analyzed must be effected with a high degree of care which makes complicated apparatus necessary. In none of the prior apparatus is a high degree of precision obtained with a normal amount of care.

In the present invention, the disadvantages of the prior apparatus have been overcome so that a high degree of precision is obtained automatically. The invention in general is directed to an automatic analyzing apparatus comprising a receiving vessel with transparent walls with said vessel being positioned between a source of light and a photoelectric cell, said receiving vessel being connected to a supply pipe for the liquid to be controlled and also to at least one supply pipe for a reagent as well as to a discharge pipe. All of the pipes are connected to the receiving vessel at the bottom thereof and are controlled by electromagnetic valves which effect a closure near the bottom, the closing of the supply valves being controlled by means of electric contacts arranged in the interior of the receiving vessel, the control circuits themselves being controlled by the liquid rising in the receiving vessel at the moment when it reaches the different contacts.

In order to describe the invention more specifically reference is made to Fig. 1 where 1 is a receiving vessel with transparent walls placed between a source of light 2, consisting of an incandescent lamp, and a photoelectric cell 3. Lenses 4 and 5 are arranged so as to direct the luminous flow on the photo-electric cell. Electromagnetic valves 6, 7, 8 and 9 are adapted to put the receiving vessel 1 in communication with the pipes 10, 11, 12 and 13 respectively. These valves are arranged to be open when a current flows through their winding and to be closed in the absence of a current. The pipe 10 is for the supply of the liquid to be controlled, the pipe 13 is the discharge pipe of the receiving vessel and the pipes 11 and 12 are respectively connected to the reservoirs 14 and 15. A motor 16 fixed above the receiving vessel 1 drives a mixing member 17.

Four contacts 18, 19, 20 and 40 pass through the wall of the receiving vessel 1 and are connected respectively to the control grid of three electron tubes, under the present circumstances three triodes 21, 22, 23, and to the ground. The electric control apparatus of the valves comprises also three other triodes 24, 25 and 26. The cathode of each triode is grounded by means of resistances 31, 32, 33, 34, 35 and 36 respectively, and the anode of each triode is connected to the terminal 28 by means of the winding of a relay 41, 42, 43, 44, 45 and 46 respectively. The control grid of each of the tubes 21, 22, 23, 24 and 26 is connected to the terminal 27 by means of resistances 51, 52, 53, 54 and 56 respectively, while the control grid of tube 25 is grounded by means of a variable resistance 55. Two condensers 47 and 48 connect respecitvely the control grid of the tubes 22 and 23 to the ground. A negative polarizing potential of the grids is applied to the terminal 27. The positive pole of a source of potential for feeding the triodes is connected to the terminal 28, its negative pole being grounded. The motor 16 is connected to terminals 29 and 30 to which the feeder potential of the motor 16 is applied.

The position of the relay contacts indicated in the drawing corresponds to their position when the winding of the relays is not energized.

The winding of the valve 6 is connected on the one hand to the terminal 28 and on the other hand to a fixed contact $c1$ of the relay 41; that of the valve 7, to the terminal 28 and to a fixed contact $b1$ of the relay 41; that of the valve 8, to the terminal 28 and to a fixed contact $b2$ of the relay 42; that of the valve 9, to the terminal 28 and a movable conact $c6$ of the relay 46. A movable contact $a1$ of the relay 41 is connected to a fixed contact $c2$ of the relay 42. A movable contact $a2$ of the latter is connected to a fixed contact e3 of the relay 43, of which a fixed contact c3 and a mobile contact d3 are both grounded. A condenser 37 connects this contact d3 to a movable contact a3, while a fixed contact b3 of this relay 43 is connected to the control grid of the tube 24. The relay 44 has two fixed contacts b4 and d4. The contact a4 is connected to the terminal 27 and b4 to the control grid of tube 25. The contacts c4 and d4 are adapted to close the supply circuit of the motor 16. The relay 45 has a movable contact a5 which is connected by means of a condenser 38 to a fixed contact c5 connected to the ground, and a fixed contact b5 which is connected to the control grid of tube 26. The control grid of tube 21 is connected to a movable contact a6 of the relay 46, two fixed contacts of which b6 and d6 are grounded. A condenser 39 is connected in parallel with the variable resistance 55.

The installation operates as follows:

When the receiving vessel 1 is empty the tubes 21, 22, 23, 24 and 26 only allow an anode current to pass that is insufficient to attract the movable contacts of the relays 41, 42, 43, 44 and 46 respectively, for their control grid is subjected to the polarizing potential applied at 27. Only the relay 45 is closed, that is to say that a5 is in contact with b5, for the anode current of tube 25 the control grid of which is grounded by the variable resistance 55 passes through its winding. The valve 6 is open, for its winding is energized. It is, as a matter of fact, connected on the one hand to the terminal 28 and on the other hand to ground by means of the contacts c1, a1, c2, a2, e3, d3. The valves 7, 8 and 9 are closed, for one end of their winding is connected respectively to the contacts b1, b2 and c6 where the circuit is interrupted.

The liquid to be controlled is delivered by the pipe 10, begins to fill the receiving vessel and reaches first of all the contact 40, thereupon the contact 18. At the moment when the level reaches the contact 18 the valve 6 closes while the valve 7 opens. The other valves remain closed. The liquid connects contact 40 and contact 18, and as its resistance is low relative to that of resistance 51, the control grid of tube 21 is practically brought to ground potential. The result is an increase of the anode current producing the closure of the relay 41, so that the movable contact a1 leaves c1 to touch b1. The winding of valve 6 is no longer energized because one of its ends is connected to the fixed contact c1 which is now unconnected. The winding of the valve 7 is energized because it is connected on the one hand to the terminal 28 and on the other hand to the ground by means of b1, a1, c2, a2, e3, d3.

The liquid coming from the reservoir 14, therefore, flows through the pipe 11. At the moment when the level in the interior of the receiving vessel 1 reaches the contact 19, the control grid of the tube 22 is, as previously, brought to a potential practically equal to that of the ground, and the relay 42 closes. The grounding of the winding of the valve 7 which was effected by b1, a1, c2, a2, e3, d3 is cut at c2 and the valve 7 closes, while the winding of the valve 8 is energized, for it is now connected to the terminal 28 and to the ground by b2, a2, e3, d3. All the valves are, therefore, closed, with the exception of valve 8, which allows the liquid contained in the reservoir 15 to flow into the receiving vessel 1 through the pipe 12.

When the level of the liquid in the receiving vessel 1 reaches the contact 20 the control grid of tube 23 is practically brought to ground potential, which causes the relay 43 to close for the same reasons as previously. In closing, the relay 43 cuts at e3 the ground return of the winding of valve 8 with the result that at that moment all the valves are closed.

The tubes 24 and 25 are principally provided for the control of the tube 26 by allowing a certain time to pass between the closing of the relay 43 and the closing of the relay 46 which will control the valve 9 for the emptying of the receiving veessel 1. Thus the tubes 24 and 25 form with the condensers 37 and 38 and the resistances 54 and 55 a delaying device. It is during the lapse of time determined by the delaying device that the colorimetrical control of the liquid by means of the luminous source 2 and the photoelectric cell 3 must be effected. The two coatings of the condenser 37 were connected by a3, b3, d3 before the closure of the relay 43. Closing the latter has the effect to connect said condenser 37 between the ground and the control grid of the tube 24 by a3, b3 so that the latter is brought to ground potential for an instant, then as the condenser is charged by the grid resistance 54, the potential of the control grid of tube 24 gradually resumes the negative polarization applied at 27. Consequently the relay 44 closes for a certain length of time which may be fixed by selecting the respective values of the condenser 37 and the resistance 54. Closing said relay 44 involves the closing of the supply circuit of the motor 16 by c4, d4. The liquid contained in the receiving vessel 1 is therefore mixed by means of the member 17 as long as the relay 44 remains closed, so as to obtain a good homogeneous mixture of liquids. Closing said relay 44 connects through a4, b4 the control grid of tube 25 to the terminal 27 to which the negative polarizing potential is applied, which causes the release of the relay 45. Opening said relay 45 short-circuits the condenser 38, one coating of which was at the polarizing potential.

When the charging of the condenser 37 across the resistance 54 is practically finished the relay 44 is released, which interrupts on the one hand the supply of the mixing motor 16 and on the other hand the connection between the control grid of tube 25 and the terminal 27. The condenser 39 which was connected to the ground and to terminal 27 will thus discharge into the variable resistance 55, so that the potential of the control grid of tube 25 gradually approaches that of the ground and the anode current of this tube increases progressively. The speed of this increase may be regulated by means of the variable resistance 55. At a certain value of this anode current the relay 45 closes again and the condenser 38 is connected between the ground and the control grid of tube 26 bringing the latter to ground potential for an instant. Hence the relay 46 closes and the winding of the valve 9 is energized as it is connected on the one hand to the terminal 28 and on the other hand to the ground by c6, d6. The receiving vessel 1 is emptied through the pipe 13 and the liquid gradually uncovers the contacts 20, 19, 18 and 40.

When the contacts 20 and 19 are uncovered the relays 42 and 43 remain closed for a certain time, for the potential of the control grids of the tubes 22 and 23 can resume the value of the polarizing potential only when the condensers 47 and 48 respectively have received a negative charge across the resistances 52 and 53 respectively. The values of these condensers 47 and 48 and of these resistances 52 and 53 are such that the relays 42 and 43 can not be released until the receiving vessel 1 is completely empty. When the level of the liquid is lowered below the contact 18 the valve 6 does not open, for the control grid of the tube 21 is grounded by the contacts a6 and b6 of the relay 46.

The time-constant of the condenser 38 and the resistance 56 is calculated to cause the relay 46 to be released only when the receiving vessel 1 is empty, however before the release of the relays 42 and 43. When the relay 46 is released, the valve 9 closes again as its supply circuit is cut off between c6 and d6 and the control grid of the tube 21 is again subjected to the polarizing potential, for it is no longer connected to the ground through a6, b6, so that the relay 41 is also released. The time-constant of the condenser and of the resistance 47 and 52 respectively 48 and 53 is so devised that the relay 42 is released a little afterwards, and the relay 43 later still.

At that moment the winding of the valve 6 is charged again, its ends being connected to the terminal 28 and to the ground by c1, a1, c2, a2, e3, d3 and the cycle of the operations begins anew.

The installation described allows one to analyze industrially the composition of various liquids. Fundamentally the liquid to be analyzed is delivered through pipe 10, the reservoir 14 containing a reagent and the reservoir 15 containing an indicating liquid. By adding these liquids there is produced a liquid the coloration of which is a function of the composition of the liquid to be analyzed. When the respective titrations of the reagent and the indicating liquid are known as well as the proportions of these in the final mixture one can reduce any given substance contained in the liquid to be analyzed by a simple colorimetric measurement.

This measurement is effected by means of the incandescent lamp 2 and the photoelectric cell 3. The voltage given by the cell 3 may be amplified and used to actuate, for example, an indicating device, an alarm device or a regulating device. This measurement must be made after the liquid has been mixed by the member 17 and before the discharge of the liquid. This may be successfully accomplished by simply passing the supply circuit of the lamp 2 through two interrupters (not shown in the drawing) actuated by the relays 44 and 45 and connected in series. Each one of said interrupters must be open when the corresponding relay is in a position of rest or release. The relay 44 is released and the relay 45 is closed until the receiving vessel 1 is full, so that the lamp is not supplied with current. Thereupon the relay 44 closes causing the release of the relay 45, so that the circuit of the lamp is not yet closed. When the relay 44 is released, which puts an end to the mixing, the relay 45 is still released so that this time the lamp 2 is supplied with current and the measurement may take place. Thereupon the relay 45 closes causing the receiving vessel 1 to be emptied by means of the relay 46 and the current supplying the lamp 2 is interrupted until the next measurement.

A safety device is introduced to prevent any overflow of liquid out of the receiving vessel 1. This device comprises a fourth contact 87 fixed to the wall of the receiving vessel 1 at a level higher than that of the three contacts 18, 19 and 20. Said fourth contact is connected directly to the winding of the discharge valve 9. Thus should the liquid rise in the receiving vessel and pass beyond the contact 20 without all the valves 6, 7 and 8 being closed, the arrival of the liquid at the contact 87 would connect the control winding of the valve 9 directly to the ground by passing through the liquid and the contact 40. Hence a current could pass through said winding and cause the discharge valve 9 to open.

The analyzing apparatus may be simplified by doing away with the reservoir 15, the valve 8 and all the elements intended for the control of said valve. The analyzing apparatus would then have only a single reservoir into which would be introduced the reagent and the indicating liquid mixed in advance in the correct proportion. Moreover, according to the composition of the liquid to be analyzed the indicating liquid is not necessary, for the reagent is sufficient for a colorimetric measurement.

Finally, it is obvious that the tubes 24, 25 and 26 and the relays 44, 45 and 46 may be replaced by a minute arrangement provided with contacts the release of which would be effected by the relay 43.

Figure 2 shows on a larger scale than Figure 1 the receiving vessel 1, the discharge valve 9 and the electromagnetic valve 6.

As shown in the drawing the receiving vessel 1 is formed by a tube 60 made of transparent material, the lower part of which is widened and closed by a metal bottom 61. A packing 62 is interposed between the lower end of the tube 60 and the bottom 61. A screw nut 63 holds the tube 60 and the bottom 61 together. A cover 64 closes the upper end of the tube 60. Said cover 64 is provided with a central bore 65, through which passes the driving axle 66 of the mixing member 17.

At the center of the bottom 61 we find the discharge opening 67 which is controlled by the valve 9. This valve 9 comprises a needle 68 cooperating with a conical seat 69 arranged in a valve body 77, and is electromagnetically controlled by means of a winding 70. A membrane 71 separates the winding 70 from the needle 68 to avoid any intrusion of liquid on the side of the winding. A spring 72 is arranged in order to maintain the needle 68 against the seat 69 when no current passes through the winding 70.

On the other hand, when the winding 70 is charged, the armature integral with the needle 68 is attracted toward the winding 70 against the action of the spring 72, which opens the valve 9 and allows the liquid to flow through the pipe 13.

In the bottom of the receiving vessel 1 open the three pipes 10, 11 and 12, the latter two not being shown in Figure 2, each controlled in the immediate neighborhood of the bottom by means of an electromagnetically controlled valve. As the three electromagnetic control valves 6, 7 and 8 are similar in construction only the valve 6 is shown in Figure 2.

Like the valve 9, the valve 6 comprises a needle 68 cooperating with a seat 69, and a spring 72 maintains the needle 68 on the seat 69 in a position of rest. The rod 74 of the needle 68 is provided with a groove 75 at a certain distance from the needle. The valve body 77' is pierced by a passage 76 facing said groove 75.

The groove 75 and the passage 76 are arranged for the purpose of permitting any outflow of liquid that may occur between the rod 74 and the valve body 77' to escape from the valve body before reaching the membrane 71.

The electromagnetic control device of the valve 6 is similar to that of the valve 9. It, also, includes a winding 70 which, when a current passes through it, attracts to it an armature 73 which is integral with the needle 68.

In all the electromagntically controlled valves the armature 73 and the membrane 71 are fixed to the rod 74 of the needle between a disc 78 riveted to the end of the rod and a disc 79 kept by means of a clamp nut 80 screwed to the stem 74.

As a variant and in order to obtain greater precision for each successive titrating operation, a rinsing liquid supply may be provided for in the receiving vessel 1 for cleaning the walls of the receiving vessel after each titrating operation.

Moreover, an analysis meter may be connected to the control apparatus, for example, an electromagnetic meter. This meter is connected in parallel with the control winding of the discharge valve 9. Thus, for each discharge of the receiving vessel 1 the meter advances one unit.

In another form of embodiment of the present invention the contacts are arranged underneath the contacts 18, 19 and 20, as well as contacts arranged above them. With such a control apparatus it is, therefore, possible to make analyses below and above the point of saturation sought.

One of the great advantages of the analyzing apparatus described above is that the receiving vessel 1 is interchangeable. Thus, according to the liquid to be controlled a receiving vessel 1 will be used in which the contacts 18, 19 and 20 are arranged at different levels, the contact 40 being always given by the bottom 61 of the receiving vessel 1.

Besides, as is shown by the diagram of Figure 1, the liquid contained in the receiving vessel 1 is not subjected to any electrolysis in the course of the colorimetric control operations, which is of prime importance for the precision of the control.

Finally, the arrival of the liquid to be analyzed and of the reagent and the indicating liquid at the bottom of the receiving vessel 1 prevents the wetting of the contacts 18, 19 and 20, which insures a perfect operation of the apparatus.

The invention in its broader aspects is not limited to the specific combinations and improvements described but departures may be made therefrom within the scope of the accompanying claims without departing from the principles of the invention and without sacrificing its chief advantages.

I claim:

1. Analyzing apparatus for liquids comprising a receiving vessel having an upper portion detachably connected to a bottom portion, said upper portion having transparent walls and being connected to a supply pipe of the liquid to be analyzed and being also connected to at least one supply pipe of a reagent as well as to a discharge pipe, all of said pipes adapted to be connected to said receiving vessel closely adjacent each other and at its bottom thereof with each of said pipes having an electromagnetic valve controlling means so as to regulate the flow of material into and out of said receiving vessel, said valves producing a closure near the bottom of the receiving vessel when they are all in a closed position, electrical control contacts positioned at different levels in the interior of the receiving vessel to control the closing action of the valves with the control contact circuits themselves being controlled by the liquid rising in the receiving vessel at the time it reaches the different contacts.

2. Analyzing apparatus as defined in claim 1, in which the receiving vessel is formed by a metal bottom on which is detachably fastened a transparent tube constituting the lateral walls of the receiving vessel, said receiving vessel having fixed electrical control contacts in its interior and being capable of being detached and replaced by another receiving vessel having fixed contacts at different levels than said first receiving vessel whereby the same apparatus may be used to control the composition of different liquids.

3. Analyzing apparatus as defined in claim 1, in which there is also a supply pipe for an indicating liquid, said supply pipe likewise being connected to the bottom of the receiving vessel and having an electromagnetic valve similar to those of the previously mentioned supply pipes, said control contacts being three in number and spaced at different height and fixed to the receiving vessel, the lowermost contact controlling the closure of the valve of the supply pipe of the liquid to be controlled and at the same time the opening of the valve of the reagent supply pipe, the intermediate contact controlling the closing of the valve of the reagent supply pipe and the opening of the valve of the indicating liquid supply pipe, the upper contact controlling the closing of the valve of the indicating supply pipe, and a delaying device which permits a period of time to pass before the opening of the valve which controls the discharge aperture.

4. Analyzing apparatus as defined in claim 3 which comprises a mixing member positioned near the bottom of the receiving vessel and driven by an electric motor, said electric motor being controlled by a relay so that it operates the moment the liquid contained in the receiving vessel reaches the upper contact.

5. Analyzing apparatus as defined in claim 3, in which there is provided a safety device to prevent any overflow of liquid out of the receiving vessel.

References Cited in the file of this patent

UNITED STATES PATENTS

| Number | Name | Date |
|---|---|---|
| 742,900 | Page | Nov. 3, 1903 |
| 1,530,833 | Keeler | Mar. 24, 1925 |
| 1,961,893 | Wadman | June 5, 1934 |
| 2,003,760 | Sweeney et al. | June 4, 1935 |
| 2,044,164 | Gulliksen | June 16, 1936 |
| 2,063,140 | Allison | Dec. 8, 1936 |
| 2,161,453 | Busby et al. | June 6, 1939 |
| 2,202,197 | Ewertz | May 28, 1940 |
| 2,251,149 | Merckel | July 29, 1941 |
| 2,415,328 | Anderson | Feb. 4, 1947 |
| 2,462,995 | Ritzmann | Mar. 1, 1949 |